US009235909B2

(12) United States Patent
Berg et al.

(10) Patent No.: US 9,235,909 B2
(45) Date of Patent: Jan. 12, 2016

(54) SIMPLIFYING THE PRESENTATION OF A VISUALLY COMPLEX SEMANTIC MODEL WITHIN A GRAPHICAL MODELING APPLICATION

(75) Inventors: Daniel C. Berg, Holly Springs, NC (US); Brad L. Blancett, Raleigh, NC (US); Michael D. Elder, Durham, NC (US); Chad M. Holliday, Holly Springs, NC (US); Narinder Makin, Morrisville, NC (US); John E. Swanke, Terryville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2322 days.

(21) Appl. No.: 12/115,689

(22) Filed: May 6, 2008

(65) Prior Publication Data

US 2009/0278847 A1 Nov. 12, 2009

(51) Int. Cl.
*G06T 11/20* (2006.01)
(52) U.S. Cl.
CPC .................................. *G06T 11/206* (2013.01)
(58) Field of Classification Search
USPC ........................................................ 345/440
See application file for complete search history.

(56) References Cited

U.S. PATENT DOCUMENTS

| | | | |
|---|---|---|---|
| 5,970,490 A | 10/1999 | Morgenstern | |
| 6,256,773 B1 | 7/2001 | Bowman-Amuah | |
| 6,629,065 B1 | 9/2003 | Gadh et al. | |
| 6,701,514 B1 | 3/2004 | Haswell et al. | |
| 6,789,054 B1 | 9/2004 | Makhlouf | |
| 6,795,089 B2 * | 9/2004 | Rajarajan et al. | 345/629 |
| 7,050,872 B2 | 5/2006 | Matheson | |
| 7,069,541 B2 | 6/2006 | Dougherty et al. | |
| 7,069,553 B2 | 6/2006 | Narayanaswamy et al. | |
| 7,134,122 B1 | 11/2006 | Sero et al. | |
| 7,196,712 B2 | 3/2007 | Rajarajan et al. | |
| 7,320,120 B2 | 1/2008 | Rajarajan et al. | |
| 7,370,315 B1 | 5/2008 | Lovell et al. | |
| 7,463,263 B2 | 12/2008 | Gilboa | |

(Continued)

OTHER PUBLICATIONS

Jay M. LightFoot, "A New Technique for Website Design Using an Interactive Visualization Hypertext Tool", In Proceedings of the 1997 ACM SIGCPR conference on Computer personnel research (SIGCPR '97), Fred Niederman (Ed.). ACM, New York, NY, USA, pp. 14-19.*

(Continued)

*Primary Examiner* — James A Thompson
(74) *Attorney, Agent, or Firm* — Patents on Demand P.A.; Brian K. Buchheit; Scott M. Garrett

(57) ABSTRACT

A model simplification tool can receive a command to simplify the presentation of a visually complex semantic model from a graphical modeling application. The visually complex semantic model can be comprised of a multitude of object representations and their associations, such that the usability of the model is impaired. An association status can be determined for each object representation, which can designate the object representation as autonomous, containment, or subordinate. The presentation of the visually complex semantic model can be consolidated based on the association status of object representations. Subordinate objects can be nested within containment objects to produce a simplified semantic model. The simplified semantic model can be rendered within the graphical modeling application.

16 Claims, 4 Drawing Sheets

(56) References Cited

U.S. PATENT DOCUMENTS

| | | | |
|---|---|---|---|
| 7,568,019 | B1 | 7/2009 | Bhargava et al. |
| 7,630,877 | B2 | 12/2009 | Brown et al. |
| 7,643,597 | B2 * | 1/2010 | Liu et al. ............... 375/360 |
| 7,665,085 | B2 | 2/2010 | Sundararajan et al. |
| 7,669,137 | B2 | 2/2010 | Chafe et al. |
| 7,735,062 | B2 | 6/2010 | de Seabra e Melo et al. |
| 2003/0163450 | A1 | 8/2003 | Borenstein et al. |
| 2004/0179011 | A1 * | 9/2004 | Marshall ............... 345/440 |
| 2006/0066627 | A1 * | 3/2006 | Gerhard et al. ......... 345/593 |
| 2006/0101091 | A1 | 5/2006 | Carbajales et al. |
| 2006/0101445 | A1 | 5/2006 | Carbajales et al. |
| 2006/0271909 | A1 | 11/2006 | Huang et al. |
| 2007/0074203 | A1 | 3/2007 | Curtis et al. |
| 2007/0179823 | A1 | 8/2007 | Bhaskaran et al. |
| 2007/0277151 | A1 | 11/2007 | Brunel et al. |
| 2007/0288885 | A1 | 12/2007 | Brunel et al. |
| 2008/0127049 | A1 | 5/2008 | Elaasar |
| 2008/0183725 | A1 | 7/2008 | Blakeley et al. |
| 2008/0313008 | A1 | 12/2008 | Lee et al. |
| 2008/0313595 | A1 | 12/2008 | Boulineau et al. |
| 2008/0313596 | A1 | 12/2008 | Kreamer et al. |
| 2009/0007062 | A1 | 1/2009 | Gilboa |
| 2009/0012842 | A1 * | 1/2009 | Srinivasan et al. ............... 705/10 |
| 2009/0044170 | A1 | 2/2009 | Bernardi et al. |
| 2009/0077621 | A1 | 3/2009 | Lang et al. |
| 2009/0132562 | A1 | 5/2009 | Mehr et al. |
| 2009/0171993 | A1 | 7/2009 | Arthursson |
| 2009/0249281 | A1 | 10/2009 | Fritzsche et al. |
| 2009/0278847 | A1 | 11/2009 | Berg et al. |
| 2009/0319239 | A1 | 12/2009 | Arnold et al. |
| 2009/0319467 | A1 | 12/2009 | Berg et al. |
| 2010/0030893 | A1 | 2/2010 | Berg et al. |
| 2010/0031247 | A1 | 2/2010 | Berg et al. |
| 2010/0058331 | A1 | 3/2010 | Berg et al. |
| 2010/0077328 | A1 | 3/2010 | Berg et al. |
| 2010/0083212 | A1 | 4/2010 | Fritzsche et al. |

OTHER PUBLICATIONS

Arnold, W., et al., "Pattern Based SOA Deployment," Proc. of 5th Int'l Conf. on Service-Oriented Computing (ICSOC 2007), Sep. 17-20, 2007, Lecture Notes in Computer Science (LNCS), vol. 4749, Springer 2007.

Eilam, T., et al., "Reducing the Complexity of Application Deployment in Large Data Centers," Proc of 9th IFIP/IEEE Int'l Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

```
findDuplicatewidgets(contained widget list)                                                                                      410
   create an empty Set called duplicatewidgetSet which will be filled with any duplicate widgets
   for each widget in the contained widget list
      get the next widget
      if this widget is already in the duplicatewidgetSet , just continue to the next contained widget
      if (duplicatewidgetSet contains widget)
         continue to next widget
      endif
      create a List called widgetList and add the widget to it
      create an empty List called previouswidgetList which will keep track of previous attempts to reach the canvas
      create a List called candidateDuplicatewidgetList which will contain a set of possible widgets to make a duplicate if there is a recursion
problem until a canvas widget is found or a recursion problem has been identified
      forever
         call getContainingwidgets() to get a list of all containing widgets as determined by containment links
List containingwidgetList = getContainingwidgets(widgetList,candidateDuplicatewidgetList)
         if there are no containing widgets, this widget has at least one canvas widget, so continue to the next contained widget
         if (containingwidgetList == null)
            continue to next contained widget (outer loop)
         endif
         empty the widgetList
         in this loop, copy widgets from containingwidgetList into widgetList that have not been encountered in a previous iteration of this loop
         for (each widget in containingwidgets list )
            if this widget is already on the duplicatewidgetSet , continue to next contained widget
            if (duplicatewidgetSet contains widget)
               continue to next contained widget (outer loop)
            endif
            if previouswidgetList does not contain this widget
               add widget to the widgetList
               add widget to the previouswidgetList
            endif
         end for
         if there was nothing copied to widgetList because all previous widgets have been processed before there's a visual recursion problem so
break out of this loop
         if (widgetList is empty) {
            break
         endif
      end for
      all containment link paths were tried and no canvas widget was found so pick a widget from the candidate list to visualize twice
      duplicatewidgetSet.add(widget from candidateDuplicatewidgetList)
   end for each widget in contained widget list
   return duplicatewidgetSet
end findDuplicatewidget
```

```
getContainingwidgets(widgetList, candidateDuplicatewidgetList)                                                                   420
   create a List called containingwidgetList
   for (every widget in widgetList)
      for every containing link on this widget
         if this widget is contained by another widget, add to containingwidgetList
            add this containingwidget to the candidateDuplicatewidgetList
      endfor
      since there can be multiple types of links and more then one can confer containment,
      repeat the previous loop for each type of containing link
      if containingwidgetList is empty, at least one link path leads to the canvas, therefore stop the loop and return null now
      if (containingwidgetList is empty)
         return null
      endif
   endfor
   return a list of all containing widgets
   return containingwidgetList
end getContainingwidgets
```

FIG. 4

SIMPLIFYING THE PRESENTATION OF A VISUALLY COMPLEX SEMANTIC MODEL WITHIN A GRAPHICAL MODELING APPLICATION

BACKGROUND OF THE INVENTION

The present invention relates to the field of semantic modeling, and, more particularly, to simplifying the presentation of visually complex semantic models in a graphical modeling application.

Semantic models are commonly used to graphically represent a variety of objects and the relationships between them. Many graphical modeling applications are commercially available that provide users with an easy and effective means for creating semantic models. However, as the semantic model increases in size and/or complexity, the coherency and readability of the graphical representation within the graphical modeling application is greatly reduced.

For example, a semantic model of an enterprise business system can include a vast quantity of objects and relationships. Because such a large and highly-connected model requires a considerable amount of presentation space, a graphical modeling application is generally unable to present the model in its entirety in a display area without a considerable reduction in size, which further reduces the readability. Additionally, relationship lines between objects that are widely dispersed are difficult to draw without obscuring other objects and/or relationships.

Graphical modeling applications currently offer little assistance for simplifying the presentation of these visually complex semantic models. Users are forced to reorganize their large, complex models in order to work with the restrictions of the modeling application. Rearranging objects, reducing object and/or text size are typical steps taken by users, which often only further reduce the readability of the model.

BRIEF SUMMARY OF THE INVENTION

The present invention can be implemented in accordance with numerous aspects consistent with the materials presented herein. One aspect of the present invention can include a method for simplifying the presentation of a visually complex semantic model. A model simplification tool can receive a command to simplify the presentation of a visually complex semantic model from a graphical modeling application. The visually complex semantic model can be comprised of multiple object representations and a multitude of associations between the object representations such that the usability of the visually complex semantic model is impaired. An association status can be determined for each object representation in the visually complex semantic model. The association status can indicate the level of association of the object representation and can designate the object representation as an autonomous object, a containment object, or a subordinate object. The presentation of the visually complex semantic model can be consolidated based on the association status of object representations. Subordinate objects can be nested within containment objects to produce a simplified semantic model. The simplified semantic model can then be rendered within a presentation area of the graphical modeling application. Associations of nested subordinate objects can be suppressed until their rendering is requested.

Another aspect of the present invention can include a simplified semantic model. Such a model can include graphical representations of subordinate objects, containment objects, autonomous objects, and associations between the objects. Subordinate objects can represent objects that are dependently-related to other objects. Containment objects can represent objects that contain at least one subordinate object. Autonomous objects can represent objects that are associatively parallel to another object.

Still another aspect of the present invention can include a system for simplifying the presentation of a visually complex semantic model. Such a system can include a set of simplification rules and a model simplification tool. The set of simplification rules can define guidelines to handle the simplification of object representations and their corresponding associations contained within the visually complex semantic model. The model simplification tool can be configured to convert the visually complex semantic model into a simplified semantic model using the plurality of simplification rules.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

FIG. 4 is a diagram of sample pseudocode used to detect a recursion problem and to duplicate objects when simplifying visually complex semantic models in accordance with an embodiment of the inventive arrangements disclosed herein.

DETAILED DESCRIPTION OF THE INVENTION

Figure 1:
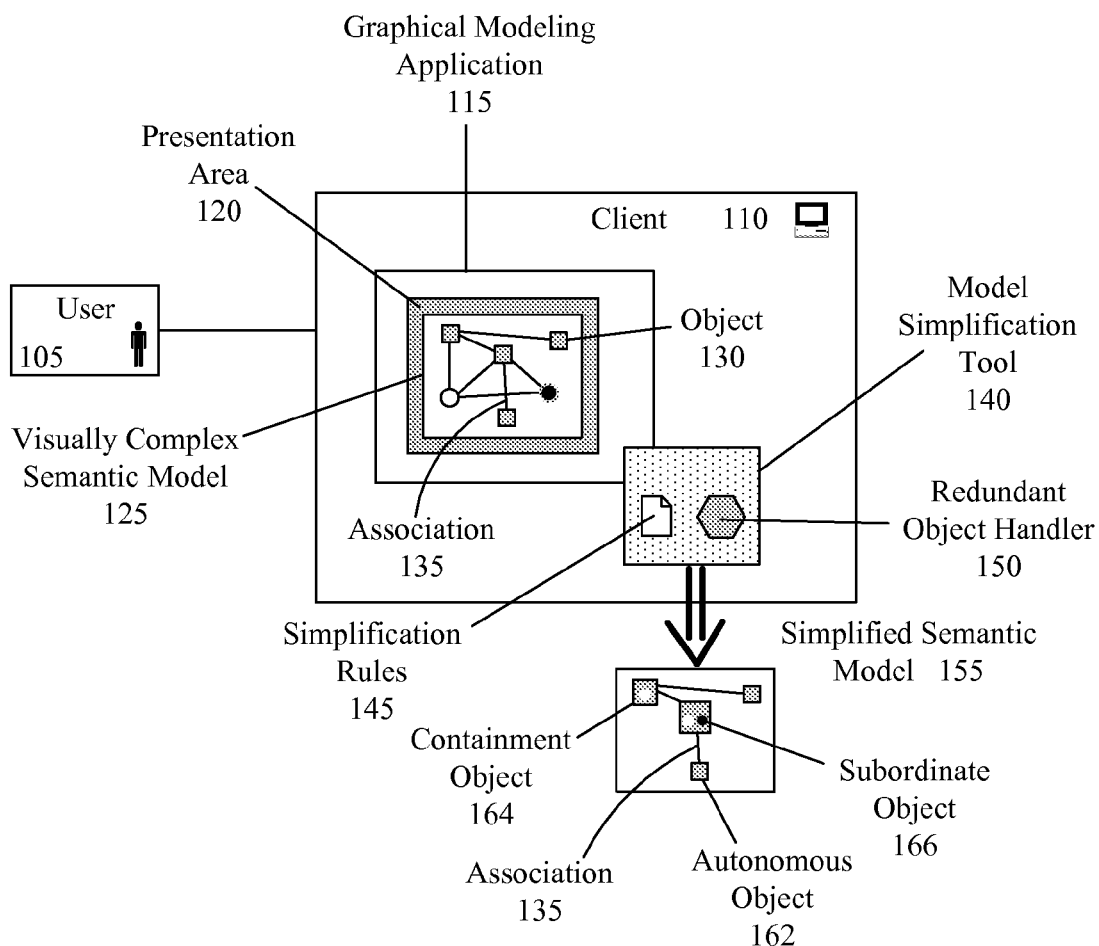
FIG. 1 is a schematic diagram illustrating a system for simplifying the presentation of a visually complex semantic model in accordance with embodiments of the inventive arrangements disclosed herein.

The present invention discloses a solution that simplifies the presentation of a visually complex semantic model within a graphical modeling tool. A model simplification tool can utilize simplification rules to transform the visually complex semantic model into a simplified semantic model. The transformation of objects and associations within the visually complex semantic model can require the determination of a containment status for each object. The containment status can indicate how an object and associations are to be structured within the simplified semantic model. Objects can be designated as autonomous, containment, or subordinate. Subordinate objects can be nested within their corresponding containment objects as a list or a tree structure. The associations of the subordinate objects can be rendered on an as-needed basis to further clarify the presentation of the simplified semantic model.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for simplifying the presentation of a visually complex semantic model 125 in accordance with embodiments of the inventive arrangements disclosed herein. In system 100, a user 105 can transform a visually complex semantic model 125 into a simplified semantic model 155 using a model simplification tool 140 in conjunction with a graphical modeling application 115.

As used herein, the term "visually complex semantic model" is used to describe a semantic model whose configuration of objects 130 and associations 135 impede the usability of the semantic model as a vehicle for presenting information in a clear and concise manner.

A visually complex semantic model 125 can contain a large quantity of objects 130 and associations 135 such that the entirety of the visually complex semantic model 125 is unable to be viewed within the presentation area 120 of the graphical modeling application 115. Alternately, a visually complex semantic model 125 can consist of a moderate quantity of objects 130 that are related by a large number and variety of associations 135. The entirety of such a visually complex semantic model 125 can be viewed in the presentation area 120; however, the high level of connectivity between the objects 130 can obscure the clarity of the associations 135.

A user 105 can utilize a graphical modeling application 115 running on a client 110 to interact with a visually complex semantic model 125. The client 110 can represent a variety of computing devices capable of supporting the operation of the graphical modeling application 115 and model simplification tool 140.

The graphical modeling application 115 can represent a commercially-available (e.g., a commercial off-the-shelf) software product or proprietary special purposed computer program product capable of operating on the client 110. The graphical modeling application 115 can include a presentation area 120 capable of rendering the visually complex semantic model 125 and simplified semantic model 155. For example, in one embodiment, the graphical modeling application 115 can be a software development modeling tool, such as IBM's RATIONAL SOFTWARE PRODUCT, and the presentation area 120 can be a modeling canvas. In another example, the application 115 can be part of an integrated development environment (IDE), such as an ECLIPSE based IDE. The application 115 can conform to any of a variety of modeling standards including, but not limited to, the Unified Modeling Language (UML), Rational Unified Process (RUP), BOOCH modeling based standards, and the like. Additionally, the graphical modeling application 115 can include any software application that utilizes a visual semantic model, which includes software object models, process models, organization models, prototype models, and the like.

It should be noted that the graphical modeling application 115 can include a variety of other elements and features for interacting with a semantic model, and that only the elements directly involved with the present invention have been represented in system 100.

The model simplification tool 140 can represent a software application configured to transform the visually complex semantic model 125 into a corresponding simplified semantic model 155. It is critical to emphasize that the simplified semantic model 155 contains the same data as the visually complex semantic model 125; only reconfigured into a more concise format. In one embodiment, the tool 140 can be implemented as a plug-in to an existing, otherwise unmodified graphical modeling application 115. In a different embodiment, the tool 140 can represent a functionality included and embedded within application 115.

The simplified semantic model 155 can represent the objects 130 of the visually complex semantic model 125 in a format based upon their type of associations 135. Object representations within the simplified semantic model 155 can include autonomous objects 162, containment objects 164, and subordinate objects 166. An autonomous object 162 can represent an object 130 from the visually complex semantic model 125 that does not have any associations 135 that represent a dependent relationship to another object 130.

A containment object 164 can represent an object 130 from the visually complex semantic model 125 that has a dependent association 135 with one or more other objects 130. For example, a Car object 130 having a composed of association 135 with a Chassis object 130 can be represented in the simplified semantic model 155 as a containment object 164. In this example, the Chassis object 130 can be identified as a subordinate object 166 of the Car containment object 164.

Subordinate objects 166 can be presented within their corresponding containment object 164. The dependent nature of the association 135 between the containment object 164 and its subordinate objects 166 can be implied by nesting the presentation of the subordinate objects 166 within the containment object 164. Different relationships between subordinate objects 166 and containment objects 164 can exist. Further, it is possible for a single subordinate object 166 to have multiple relationships with a containment object 164. In one embodiment, a visual indicator can indicate a type of relationship between the subordinate object 166 and the containment object 164, when the simplified semantic model 155 is rendered in a canvas.

For example, using a UML relationship example, object A (e.g., an instance of containment object 164) can contain objects B and C (e.g., each instance of a subordinate object 166). Object B can have a generalization relationship with object A and object C can have an association relationship with object A. Objects B and C can be rendered in a subordinate list of containment object A with a visual indication to show the type or kind of relationship each (objects B and C) have with object A. In another example, object B can have both a generalization and an association relationship with object A. These multiple subordinate relationships can be visually expressed by duplicating object B in a subordinate list of containment object A, so that when rendered in a canvas object B appears once for each relationship along with a relationship indicator.

To assist in the creation of the simplified semantic model 155, the model simplification tool 140 can include a set of simplification rules 145 and a redundant object handler 150. The simplification rules 145 can define the guidelines for handling the conversion of an object 130 and its corresponding associations 135 from the visually complex semantic model 125 to its simplified representation within the simplified semantic model 155. For example, a simplification rule 145 can state that an object 130 with at least one dependent association 135 should be treated as a subordinate object 166.

The redundant object handler 150 can represent a component of the model simplification tool 140 that can be configured to handle occurrences where an object 130 from the visually complex semantic model 125 is required to be reiterated within the simplified semantic model 155. For example, a circular relationship between objects 130 in the visually complex semantic model 125 can be resolved by creating multiple instances of the containment 164 or subordinate 166 object within the simplified semantic model 155.

The redundant object handler 150 can also be used to handle a redundancy created by the user 105 when working with the simplified semantic model 155. For example, the user 105 can copy a subordinate object 166 outside of its containment object 164 in order to have a full-sized version of the subordinate object 166 to work with in the presentation area 120 of the graphical modeling application 115.

In one embodiment, to clearly identify an object repeated in the simplified semantic model 155, the redundant object handler 150 can attach a unique identifier to the name of each instance. Additionally, the redundant object handler 150 can designate a particular instance of the repeated object as a primary instance to store the locations of the other instances. Internally tracking the instances of a redundant object can ensure that deletion commands are handled properly within the simplified semantic model 155 without relying on the user 105 to know the location of all object instances. For example, a deletion of the primary instance can be propagated through the model 155 to delete all other instances of the object.

In another embodiment, a separate (JAVA) map can be utilized that maintains a list of all semantic objects 130, which includes duplicates. When the map is queried based upon an object identifier, a list of all the semantic objects stored in the map is returned. When there is only one object in the map, only one item is returned. Deletion commands can be properly handled by deleting a set of objects returned from the map query. Thus, there is no need to designate one instance of a repeated object as a primary instance (i.e., propagation of a deletion action through the model 155 is not necessary, since use of the map containing duplicates ensures all objects in the model 155 having that object identifier are deleted.)

The model simplification tool 140 and graphical modeling application 115 can both be configured to interface with each other. For example, the model simplification tool 140 can be invoked from the graphical modeling application 115. Further, the graphical modeling application 115 can execute commands upon a simplified semantic model 155 displayed in the presentation area 120.

In an alternate embodiment, the model simplification tool 140 can operate as a stand alone application upon an electronic file (not shown) containing the visually complex semantic model 125, producing a simplified semantic model 155 that can be stored in an electronic format for later rendering by the graphical modeling application 115.

Figure 2:
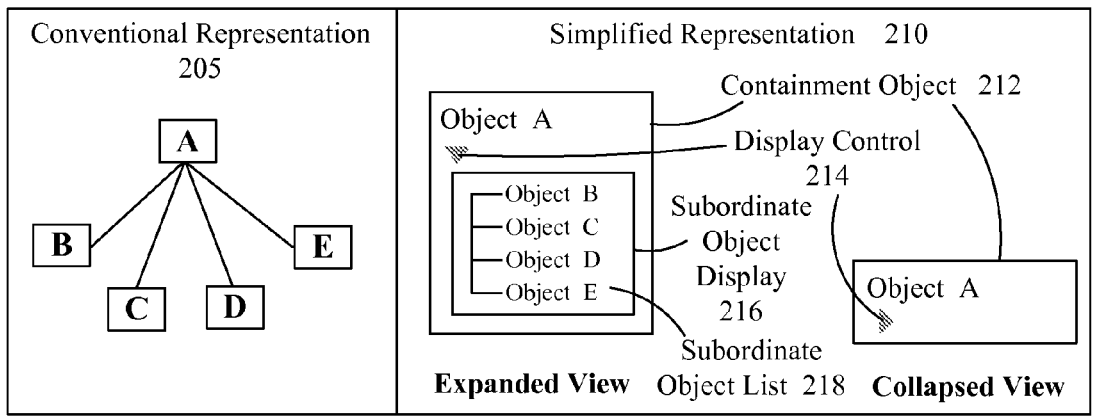
FIG. 2 is a collection of examples illustrating the representation of object structures within a simplified semantic model in accordance with an embodiment of the inventive arrangements disclosed herein.
Figure 2:
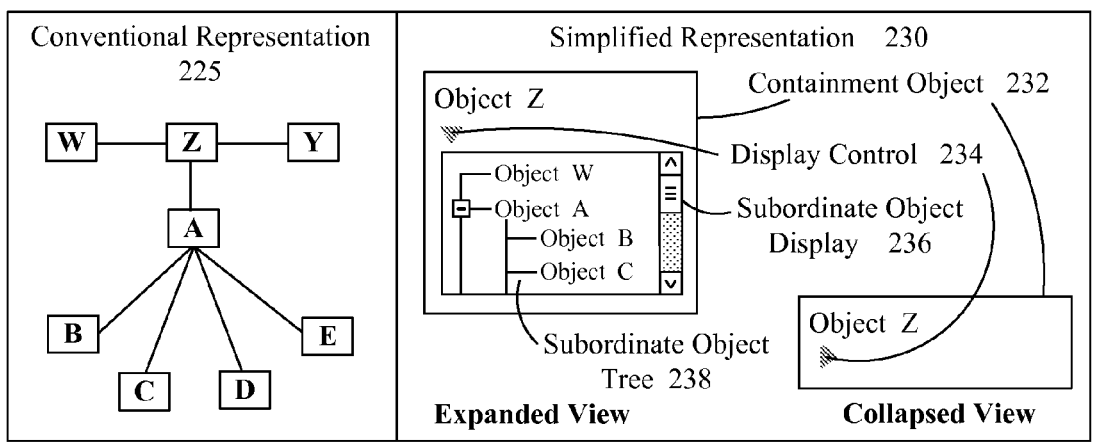
Figure 2:
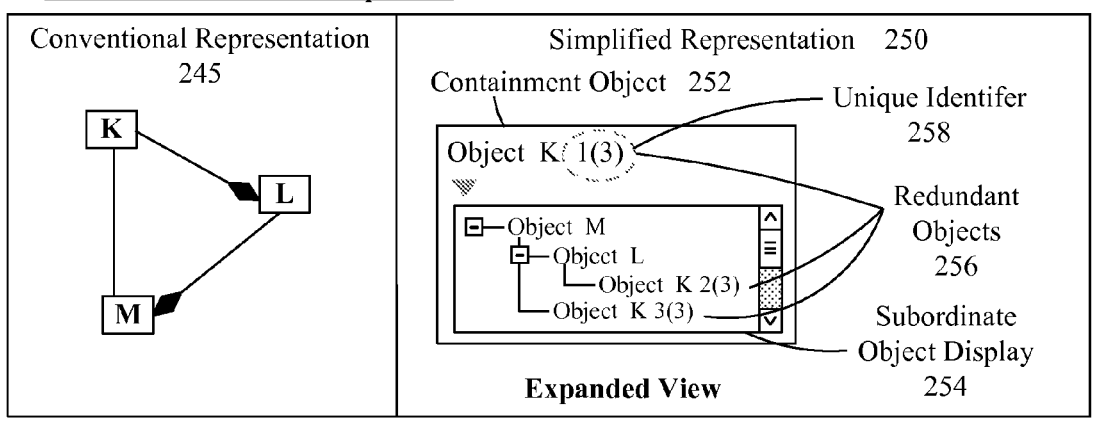

FIG. 2 is a collection of examples 200, 220, and 240 illustrating the representation of object structures within a simplified semantic model in accordance with an embodiment of the inventive arrangements disclosed herein. These examples 200, 220, and 240 can be produced within the context of system 100 or any other system supporting the simplification of visually complex semantic models using embedded structures.

It should be noted that the structures shown in the examples 200, 220, and 240 are not meant to represent a visually complex semantic model, but illustrate how portions of a visually complex semantic model can be simplified.

Example 200 can depict the simplification of a structure containing multiple dependent objects. The conventional representation 205 can represent how multiple dependent objects can be presented in a typical graphical modeling application. As shown in this example 220, objects B, C, D, and E can be dependently related to object A. It is important to note that all objects A, B, C, D, and E are graphically displayed when the model is rendered.

The simplified representation 210 of the conventional representation 205 can also present objects A, B, C, D, and E, but in a different format. In the simplified representation 210, objects B, C, D, and E can be presented differently than object A based on their dependent relationship.

As shown in the simplified representation 210, object A is graphically presented as a containment object 212. Objects B, C, D, and E can be textually displayed in an expanded view as a subordinate object list 218 within the subordinate object display 216. Thus, a graphical modeling application would only need to render one graphical object instead of rendering five graphical objects as in the conventional representation 205.

To further reduce the display space required to render a containment object 212, the containment object 212 can include a user-selectable display control 214 that can hide the subordinate object display 216, resulting in a collapsed view.

Example 220 can depict the simplification of a structure containing a dependent object that has multiple dependent objects. The conventional representation 225 can represent how an object that is dependent to one object but also has multiple objects dependently related to it can be presented in a typical graphical modeling application. As shown in this example 220, object A can be dependently related to object Z with objects B, C, D, and E dependently related to object A. Objects W and Y can also be dependently related to object Z. It is important to note that all objects of the conventional representation 225 are graphically displayed when the model is rendered in a graphical modeling application.

The simplified representation 230 of the conventional representation 225 can also present objects A, B, C, D, E, W, Y, and Z, but in a different format. Similar to example 200, object Z can be graphically presented as a containment object 232 since all other objects are either directly or indirectly dependently related to it.

The subordinate objects of object Z can be textually displayed in an expanded view as a subordinate object tree 238 within the subordinate object display 236. A tree 238 can be used, contrast to the list 218 of example 200, to capture the dependent association between object A and objects B, C, D, and E. The tree structure 238 can include branches that can be expanded and collapsed to control the display of objects within the subordinate object display 236.

As with example 200, a graphical modeling application would only need to render one graphical object instead of rendering eight graphical objects as in the conventional representation 225. To further reduce the display space required to render a containment object 232, the containment object 232 can include a user-selectable display control 234 that can hide the subordinate object display 236, resulting in a collapsed view.

Example 240 can depict the simplification of a structure containing objects in an infinite containment loop, which has a conventional representation 245 as shown. An infinite containment loop can be defined as a circular reference among a set of the objects. In an infinite containment loop, all of the objects of the loop are subordinate to other ones of the objects. There is no true "uncontained" container object. For example, object A can contain object B; object B can contain object C; and object C can contain object A. Additional cyclic containment relationships can also exist. For example, object A can contain object B, which contains object A. Also, object A can contain object B, which contains object C, which contains object A.

When creating the simplified representation 250, it is important to detect an infinite containment loop and then to select one of the objects (object A, object B, or object C). This selected object is then considered an uncontained object 252, which is rendered upon a canvas. The same selected object has at least one duplicate, which is treated as a subordinate object in subordinate object display 254.

As shown in example 240, object M can be related to object K such that both objects are aware of each other, as in an Association within the Unified Modeling Language (UML). Object M can have a composition association with object L, which can have a composition association object K. The simplified representation 250 can represent how a model simplification tool can utilize redundant objects 256 to resolve this situation.

In the simplified representation 250, object K can be determined to be the containment object 252. This determination can be made by the model simplification tool using elements such as the redundant object handler 150 and/or simplification rules 145 of system 100. Despite being the containment object 252, object K can be repeated within the subordinate object display 254 as redundant objects 256 to show the additional associations between object K and the objects M and L.

Each redundant object 256 can include a unique identifier 258. In this example, the unique identifier 258 is an index numbering scheme detailing that numbers each redundant object 256 and indicates the total number of copies with the number in parentheses.

As with the other examples 200 and 220, the subordinate object display 256 of the containment object 252 can be hidden in a collapsed view (not shown).

Figure 3:
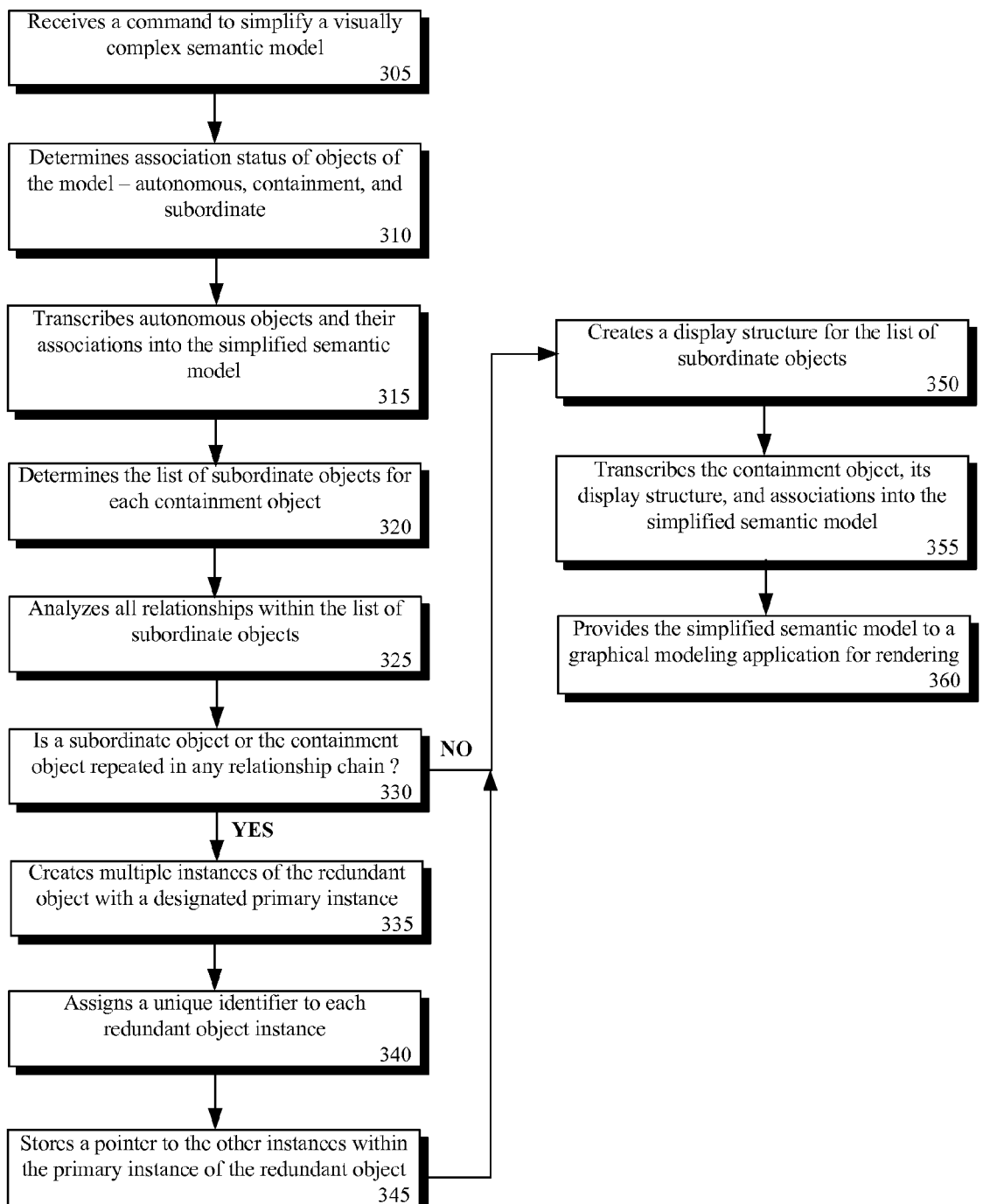
FIG. 3 is a flow chart of a method describing the simplification of a visually complex semantic model by a model simplification tool in accordance with an embodiment of the inventive arrangements disclosed herein.

FIG. 3 is a flow chart of a method 300 describing the simplification of a visually complex semantic model by a model simplification tool in accordance with an embodiment of the inventive arrangements disclosed herein. Method 300 can be performed in the context of system 100 and/or utilize the examples 200, 220, and 240 of FIG. 2.

Method can begin with step 305 where the model simplification tool can receive a command to simplify a visually complex semantic model. The command can be executed by a user from within a graphical modeling application and/or directly from the model simplification tool. The model simplification tool can determine an association status for each object in the model in step 310. Objects can be designated autonomous, containment, and subordinate.

In step 315, objects with an association status of autonomous and their related associations can be transcribed to the simplified semantic model. It should be noted that step 315 is shown to emphasize that autonomous objects do not require restructuring since they do not contain nor are they contained by any other object. Step 315 can also be consolidated into a step that transcribes all objects into the simplified semantic model.

The processing of containment and subordinate objects can begin in step 320 where an inclusive list of subordinate objects can be determined for each containment object. The model simplification tool can analyze all the relationships within the list of subordinate objects in step 325.

In step 330, an infinite containment loop can be identified by determining the repetition of either a subordinate object or the containment object in any chain of relationships between the objects. When a redundant object is found, step 335 can execute where multiple instances of the redundant object can be created with one of the instances designated as the primary instance. Each instance of the redundant object can be assigned a unique identifier in step 340. In step 345, pointers to the other instances of the redundant object can be stored in the primary instance.

Steps 330-345 as shown in FIG. 3 assume an implementation that utilizes a primary instance, where deletions of object instances linked to the primary instance are propagated through a simplified model. It should be appreciated that other implementations exist and that the invention is not limited in this regard. For example, in an alternative implementation, a map containing all object instances including duplicates can be utilized. Use of this map negates a need for designating a primary instance, as previously mentioned.

Upon completion of step 345 or when a redundant object is not found within the list of subordinate objects, flow can proceed to step 350 where a display structure can be created for the subordinate objects. The display structure can be constructed as a list or a tree, depending upon whether any subordinate object contains additional dependent objects.

In step 355, the model simplification tool can transcribe the containment object, its display structure, and associations into the simplified semantic model. The model simplification tool can provide the simplified semantic model to a graphical modeling application for rendering in step 360.

FIG. 4 is a diagram of sample pseudocode 410, 420 used to detect a recursion problem and to duplicate objects when simplifying visually complex semantic models in accordance with an embodiment of the inventive arrangements disclosed herein.

The code 410, 420 can be used to find and respond to infinite containment loops, as expressed in example 240 of FIG. 2. The code 410, 420 is to illustrate one potential means for implementing underlying code and is not intended as a limitation of the scope of the inventive arrangements disclosed herein. In the code example 410, 420 a widget is a term used to refer to an object of a semantic model.

Before the code 410, 420 is called, a contained widget list can be created by iterating thought all containment links on each widget and by adding any contained widgets to the list. A containment link can be a relationship between two widgets to be rendered by containing one widget within another (i.e., a containment object is to be used).

Programmatic instructions can iterate through the contained widget list to ensure that each widget in the list is eventually contained by a widget (e.g., containment object) presented in a canvas showing a simplified representation of a model (i.e., each widget is eventually included in the simplified semantic model). More specifically, each containment link of each widget can be examined to find all of the containing widgets, each of those can be examined to find all of their containment links, and so forth. If one containing widget along a containment link path appears in the simplified semantic model, the widget can be drawn within at least one container and duplicate widgets do not need to be drawn.

As shown in code 410, the findDuplicatewidgets method can be used to determine if any widget in the contained widget list should be duplicated. The method also selects widgets to be duplicated.

The getContainingwidgets method 420 can be a helper method that finds the containing widgets of a widget. Because a widget may be several containers deep and have multiple paths within a model, getContainingwidgets method can be called for each level of containers above a widget.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for simplifying the presentation of a visually complex semantic model comprising:

within a presentation area of a graphical modeling application running on a computing device, visually displaying on a display screen a visually complex semantic model, comprising a first quantity of visual objects and a first quantity of associations between the objects, wherein each visual object is visually connected to another of the objects by at least one association, wherein each association visually represents a relationship between the objects shown on the display screen;

the graphical modeling application running on the computing device receiving a user-selected command to simplify a presentation of the displayed visually complex semantic model by a model simplification tool determining an association status for each object representation in the visually complex semantic model according to a plurality of simplification rules, wherein the association status determined for each of the objects is one of an autonomous object, a containment object, and a subordinate object; and transforming the presentation of the visually complex semantic model into a different visual representation referred to as a simplified semantic model, which is visually displayed in the presentation area, wherein the simplified semantic model comprises a second quantity of objects and a second quantity of simplified associations, wherein each displayed object of the second quantity is connected to another object of the second quantity by at least one of the simplified associations, wherein at least a portion of the objects of the second quantity are containment objects comprising at least one subordinate object visually nested within the containment object, wherein the second quantity of objects is less than the first quantity of objects, wherein the second quantity of associations is less than the first quantity of associations, and wherein each object of the visually complex semantic model is represented within the simplified semantic model by an object of the second quantity or by at least one subordinate object, wherein the simplified semantic model is rendered within the presentation area of the graphical modeling application.

2. The method of claim 1, wherein the determining and consolidating steps are performed by a model simplification tool utilizing a plurality of simplification rules defining object and association transformations.

3. The method of claim 1, wherein the consolidating step further comprises:

compiling a list of at least one subordinate object for each containment object;

generating a display structure for the compiled list; and incorporating the display structure into the containment object.

4. The method of claim 3, wherein the display structure comprises at least one of a list structure and a tree structure, wherein branches of the tree structure are able to be expanded and collapsed in response to a user-selected command.

5. The method of claim 3, wherein a presentation of the display structure within the containment object when rendered within the graphical modeling application is controlled by a user-selectable mechanism, wherein a first setting presents the display structure within the containment object and a second setting removes the presentation of the display structure from the containment object.

6. The method of claim 1, wherein said steps of claim 1 are performed by at least one machine in accordance with at least one computer program stored in a computer readable media, said computer programming having a plurality of code sections that are executable by the at least one machine.

7. A computer program product for a simplified semantic model comprising:

a non-transitory storage medium comprising computer program code for:

transforming a visually complex semantic model into a simplified semantic model, wherein the visually complex semantic model comprises a first quantity of visual objects and a first quantity of associations between the objects, wherein each visual object is visually connected to another of the objects by at least one association, wherein each association visually represents a relationship between the objects able to be shown on a display screen when visually complex semantic model is visually rendered, wherein the simplified semantic model comprises a second quantity of objects and a second quantity of simplified associations, wherein each displayed object of the second quantity is connected to another object of the second quantity by at least one of the simplified associations, wherein at least a portion of the objects of the second quantity are containment objects comprising at least one subordinate object visually nested within the containment object, wherein the second quantity of objects is less than the first quantity of objects, wherein the second quantity of associations is less than the first quantity of associations, and wherein each object of the visually complex semantic model is represented within the simplified semantic model by an object of the second quantity or by at least one subordinate object, wherein within the simplified semantic model comprises:

a plurality of the subordinate objects visually representing objects that are dependently-related to other objects of the second quantity;

a plurality of the containment objects graphically representing objects of the second quantity that contain at least one subordinate object;

a plurality of autonomous objects graphically representing objects of the second quantity that are associatively parallel to at least one of an autonomous object, a containment object, and a subordinate object; and a plurality of associations comprising the simplified associations, wherein the plurality of associations are configured to graphically represent relationships between the plurality of subordinate objects, the plurality of containment objects, and the plurality of autonomous objects.

8. The computer program product of claim 7, wherein a containment object further comprises:
a display area configured to visually present the at least one subordinate object related to the containment object, wherein the at least one subordinate object is presented in a textual manner as at least one of a list and a tree.

9. The computer program product of claim 8, wherein a presentation of the display area is controlled by a user-selectable control mechanism within a graphical modeling application, wherein a first setting presents the display area within the containment object and a second setting removes the presentation of the display area from the containment object.

10. The computer program product of claim 8, wherein a presentation of a subordinate object within the display area includes a denotation of an association type between the subordinate object and the containment object.

11. The computer program product of claim 7, wherein the plurality of subordinate objects further comprises:
a plurality of redundant objects configured to represent a circular relationship between at least three objects, wherein each redundant object is denoted with a unique identifier.

12. The computer program product of claim 7, wherein a configuration of the components of claim 11 are produced by a model simplification tool, wherein the configuration is visually rendered within a graphical modeling application.

13. A system for simplifying a visually complex semantic model comprising:
hardware and software suitable for storing and/or executing program code, wherein said hardware comprises at least one processor coupled directly or indirectly to memory elements through a system bus, said software stored upon and executing on the hardware comprising program code for:
a plurality of simplification rules configured to define guidelines for handling a simplification of object representations and corresponding associations contained within a visually complex semantic model; and
a model simplification tool configured to convert the visually complex semantic model into a simplified semantic model based upon the plurality of simplification rules, wherein dependently-related objects are nested within respective associatively superior objects,
wherein the visually complex semantic model comprises a first quantity of visual objects and a first quantity of associations between the objects, wherein each visual object is visually connected to another of the objects by at least one association, wherein each association visually represents a relationship between the objects able to be shown on a display screen when visually complex semantic model is visually rendered, wherein the simplified semantic model comprises a second quantity of objects and a second quantity of simplified associations, wherein each displayed object of the second quantity is connected to another object of the second quantity by at least one of the simplified associations, wherein at least a portion of the objects of the second quantity are containment objects comprising at least one subordinate object visually nested within the containment object, wherein the second quantity of objects is less than the first quantity of objects, wherein the second quantity of associations is less than the first quantity of associations, and wherein each object of the visually complex semantic model is represented within the simplified semantic model by an object of the second quantity or by at least one subordinate object.

14. The system of claim 13, wherein the model simplification tool further comprises:
a redundant object handler configured to resolve an infinite containment loop encountered by the model simplification tool when creating the simplified semantic model, wherein the infinite containment loop represents a circular reference between related object representations in the visually complex semantic model.

15. The system of claim 14, wherein the redundant object handler incorporates multiple instances of a redundant object representation into the simplified semantic model, wherein each instance is identified by a unique identifier.

16. The system of claim 13, wherein the model simplification tool is invoked from a graphical modeling application that is graphically presenting the visually complex semantic model.

* * * * *